US007016324B2

(12) United States Patent
Agrawal et al.

(10) Patent No.: US 7,016,324 B2
(45) Date of Patent: **\*Mar. 21, 2006**

(54) SYSTEM AND METHOD FOR DYNAMICALLY ALLOCATING IP ADDRESSES FOR SHARED WIRELESS AND WIRELINE NETWORKS BASED ON PRIORITIES AND GUARD BANDS

(75) Inventors: Prathima Agrawal, New Providence, NJ (US); David Famolari, Montclair, NJ (US); Tao Zhang, Fort Lee, NJ (US)

(73) Assignees: Telcordia Technologies, Inc., Piscataway, NJ (US); Toshiba America Research, Inc., Piscataway, NJ (US)

( * ) Notice: Subject to any disclaimer, the term of this patent is extended or adjusted under 35 U.S.C. 154(b) by 983 days.

This patent is subject to a terminal disclaimer.

(21) Appl. No.: 10/045,266

(22) Filed: Oct. 23, 2001

(65) Prior Publication Data

US 2003/0076805 A1    Apr. 24, 2003

(51) Int. Cl.
*H04Q 7/00*    (2006.01)

(52) U.S. Cl. ...................... 370/331; 370/392; 370/401

(58) Field of Classification Search ................. None
See application file for complete search history.

(56) References Cited

U.S. PATENT DOCUMENTS

| 6,427,170 B1 * | 7/2002 | Sitaraman et al. .......... 709/226 |
| 6,725,047 B1 * | 4/2004 | Farley et al. ............ 455/456.3 |
| 6,845,094 B1 * | 1/2005 | Zhang ........................ 370/349 |
| 6,888,803 B1 * | 5/2005 | Gentry et al. ............... 370/259 |
| 2002/0049058 A1 * | 4/2002 | Tee ............................ 455/437 |
| 2003/0033541 A1 * | 2/2003 | Edmark et al. ............. 713/201 |

* cited by examiner

*Primary Examiner*—Chau Nguyen
*Assistant Examiner*—Anthony Sol
(74) *Attorney, Agent, or Firm*—Joseph Giordano; James W. Falk

(57) ABSTRACT

A method and system is provided for periodically and dynamically updating allocation pools of IP address which are reserved for wireless or wireline hosts. A system IP address server controls an entire address pool, contains predictive analysis logic, performs a predictive analysis, partitions the IP addresses into distinct address pools, and maintains "wireless guard bands" of IP addresses for wireless users to ensure that a higher priority address pool is never exhausted before an address pool which has a lower priority.

10 Claims, 5 Drawing Sheets

SYSTEM AND METHOD FOR DYNAMICALLY ALLOCATING IP ADDRESSES FOR SHARED WIRELESS AND WIRELINE NETWORKS BASED ON PRIORITIES AND GUARD BANDS

BACKGROUND OF THE INVENTION

1. Field of the Invention

The present invention generally relates to the use of Mobile Internet protocol (IP) systems, methods and protocols in personal communication systems (PCS) and, more particularly, to a method for dynamically allocating IP addresses for shared wireless and wireline networks based on priorities and guard bands.

2. Description of the Related Art

With the proliferation of wireless cellular devices (mobile stations), an increasing need has arisen for a methodology and system to provide seamless mobile access to the Internet via existing personal communication services (PCS) networks. To meet this need, a wireless access system must support high-speed packet data transmissions and must also efficiently communicate with the Internet backbone. While emerging PCS technologies, such as CDMA2000 and Wideband CDMA (WCDMA), define packet data transmission over the air interface, none of these systems present a flexible architecture for connecting a wireless access system to the Internet backbone which is also suitable for general mobile IP interconnectivity.

FIG. 1 is an illustration of a conventional cellular system network 10. The network 10 includes a mobile switching center (MSC) 12 connected to one or more base station controllers (BSC) 14. Each BSC 14 controls one or more base stations (BS) 16 which provide wireless communication links to various mobile stations (MS) 18. The MSC 12 interfaces to a public switched telephone network (PSTN) 20 for routing the voice calls and to a separate signaling system 22 for signaling used for PCS mobility management. Such a conventional cellular system provides Internet access through voiceband modems in the mobile stations, which connect to an Internet access server (not shown) interfaced to the MSC 12, either directly or via the PSTN 20. Alternatively, an interworking function (IWF) 24 interfaced directly to the MSC provides the interworking of protocols between the air interface and the Internet.

Although conventional cellular systems provide adequate data and voice service in some circumstances, such network configurations suffer from several deficiencies. In particular, the connection model is based on dialup modems where the IWF acts as a server, providing a point-to-point connection to the MS and assigning a temporary IP address to the MS that is valid only during the session. When the MS changes the point of attachment with the Internet (i.e., a hand off is performed), a new session must be established and a new temporary address must be assigned to the MS using an address assignment scheme. Therefore, an Internet session cannot be maintained as the MS changes the point of attachment.

As the MS moves across different subnets, packet delivery to the MS is based on the temporary IP address and not the static IP address of the MS. Since the MS does not have a static IP address, datagrams cannot be delivered to the MS until the MS has established a Point-to-Point Protocol (PPP) session and the host attempting to send data knows the temporary IP address of the MS.

The advent of wireless IP networks has presented challenging problems in the area of dynamic IP address allocation. Wireless IP networks comprise a plurality of network cells wherein a plurality of handoff and resident hosts communicate with the wireless IP network. Handoff hosts are network hosts whose initial network connection was established in another cell and that subsequently migrated to a new network cell. In contrast, resident hosts are hosts whose initial network connection was established in the present cell and that have not migrated to another network cell. Each network cell further includes a base station that maintains handoff and resident host network connections within the network cell, and facilitates dynamic handoff of handoff hosts within its cell.

The base station within each cell facilitates a network connection with its handoff and resident users through IP addresses assigned to the network hosts within the cell. Thus, an IP address must be allocated to the handoff and resident hosts within a cell to establish and maintain a network connection. The IP addresses dedicated to the handoff and resident hosts can be allocated by methods including an IP address server system(s) that assigns IP addresses for new hosts, and base stations themselves that may determine their own necessary IP address allocation. IP address servers that allocate IP addresses can include servers that are part of a base station itself, or can include IP address servers that are attached to the network and send IP address allocations to the base station within a cell. These IP address allocation methods and apparatuses confront a number of problems when allocating IP addresses to handoff and resident hosts within their cells.

First, whenever a host initially establishes a network connection within a cell, the host is considered a resident host, because it establishes its initial network connection within the cell. In order for the resident host to establish its network connection, a base station within the cell must allocate an IP address from the cell's IP address pool to the resident host. In contrast, whenever a resident host migrates to a new cell after already having its network connection in a prior cell, the host becomes a handoff host, and the new cell must maintain the preexisting network connection of the handoff host. If the new cell has a different IP subnet address relative to the prior cell, the new cell must allocate a new IP address to the handoff host in order to maintain the handoff host's network connection from the prior cell.

Current dynamic IP address allocation protocols such as Dynamic Host Configuration Protocol (DHCP) treat resident and handoff hosts as equivalent and without preference when allocating IP addresses to these hosts. Thus, a base station may allocate an IP address to a resident host instead of a handoff host, thereby permitting a new resident network connection in place of the prior network connection of a handoff host network, which then must be dropped. This equal treatment is obviously undesirable, because denying a resident host an IP address will merely prevent a new network connection, whereas denying a handoff host an IP address causes its preexisting network connection to be terminated. Thus, IP address allocations to handoff hosts should be preferred to IP address allocation of resident hosts in order to facilitate the handoff of preexisting handoff host network connections.

Second, the problem of handoff and resident host network access is further aggravated due to the fact that there is no minimum number of IP addresses that are reserved by individual cells to ensure a certain level of host access. The minimum number of IP addresses available will vary from cell to cell, and thus handoff and resident hosts will have differing degrees of access to the IP network based on the particular cell wherein the host is communicating with the network. As a result, fair access to the wireless IP network for handoff and resident hosts differs from cell to cell, because one cell may have significantly fewer IP addresses to allocate relative to another cell. This is another limitation of present IP address allocation protocols, because it is desirable to ensure fair access of handoff and resident hosts to the network regardless of the particular cell wherein these hosts reside.

In sum, present dynamic IP address allocation protocols for wireless IP network systems suffer from two significant problems. First, these protocols treat resident and handoff hosts equally when allocating IP addresses, thereby causing preexisting handoff host network connections to be dropped in favor of new resident host network connections, when it is preferable to preserve a preexisting handoff host network connection by denying a new resident host network connection. Second, there is no minimum number of IP addresses allocated to individual cells, thereby causing fair access problems when different cells provide different numbers of IP addresses for handoff and resident hosts. As a result, network access is arbitrarily dependent upon the cell in which the handoff and network host reside.

Accordingly, it is apparent that there is a need and desire for a method for dynamically allocating IP addresses to wireless and wireline IP hosts that share the same pool of IP addresses such that handoff hosts will possess a higher probability of obtaining a new IP address than recently powered local hosts, and such that a proper balance is achieved between the number of IP addresses allocated to wireless and wireline IP hosts.

SUMMARY OF THE INVENTION

The present invention is a system and method for dynamically allocating IP addresses for shared wireless and wireline networks based on priorities and guard bands. In accordance with the invention, the method differentiates between wireless hosts and wireline hosts such that priorities for connecting each host are established prior to handing off mobile calls.

A single system IP address server is used to periodically and dynamically update allocation pools of IP addresses which are reserved for wireless or wireline hosts. The system IP address server controls an entire address pool, contains predictive analysis logic, performs a predictive analysis, partitions the IP addresses into distinct address pools, and maintains "wireless guard bands" of IP addresses for wireless users to ensure that a higher priority address pool is never exhausted before an address pool which has a lower priority. The system IP address server also possesses an interface with which to add or delete IP addresses from each of the distinct address pools as required.

Within the pool of IP addresses allocated to wireless hosts, a "handoff guard band" of IP addresses is established for handoff hosts. Further, handoff hosts are provided with a higher access priority than other hosts such that system IP address servers process address requests from the handoff hosts before processing requests from other hosts. As a result, handoff latencies for wireless calls are reduced.

Predictive analysis is performed in the system IP address server to determine the number of IP addresses to allocate to wireless terminals in a handoff state, wireless terminals in a resident state, and wired terminals. In certain embodiments, the predictive analysis is performed using a moving weighted average, where the average number of requests from hosts in each category is recorded and the average number of total IP addresses over a suitable fixed period of time is computed. In other embodiments, the size of the guard bands is calculated statistically by determining the required volume of IP addresses over a fixed period of time. Here, various statistical parameters may be used, such as the time of day, the "mix" of traffic, special situations (expected and unexpected), or the like.

A priority is assigned to a host requesting a new IP address. Handoff hosts are provided with a higher access priority than other hosts such that system IP address servers process address requests from the handoff hosts before processing requests from other hosts. Priorities of the hosts are communicated to the IP address servers (e.g., the DHCP servers). As a result, the servers will first service the host having the highest priority. This permits wireless terminals to obtain IP addresses faster during handoff, and therefore reduces handoff latencies.

A classification process is used to classify wireless hosts into handoff hosts and dormant hosts. Handoff hosts carry active sessions across network boundaries and are rapidly configured with a valid IP address to preserve application level quality. Dormant hosts are those that are not actively communicating, and therefore possess greater latency latitudes with respect to the configuration of the IP address.

A minimum number of addresses, i.e., a wireless handoff IP address pool or a wired terminal IP address pool (a classification), which cannot be affected by a particular reallocation scheme, is made available to each category of device accessing the network. As a result, the system IP address server will be unable to revoke addresses from a classification such that the total number of addresses available in the classification is never brought below the guard band number. In addition, if a number of addresses are allocated as a result of wireless terminal requests that brings the total available IP addresses in such an allocation pool below the number of addresses in the guard band, an automatic request occurs to replenish the allocation pool up to the guard band level.

In accordance with the invention, a wireless handoff host is distinguished from a wireless resident host by determining whether the host has changed, or is in the process of changing, its current point of attachment to the network. For instance, handoff hosts are required to have undergone link-layer handoff procedures to establish a valid link layer with which to communicate with a base station. The base station will possess knowledge of this, and can use this information to identify hosts that have been handed off from other base stations.

A wireless IP address agent resides in the wireless network. Each wireless IP address agent handles requests for IP addresses from the wireless terminals, categorizes the wireless terminal as handoff or resident, and then forwards the IP address associated with the handoff or resident to the system IP address server.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF EXEMPLARY EMBODIMENTS

Figure 1:
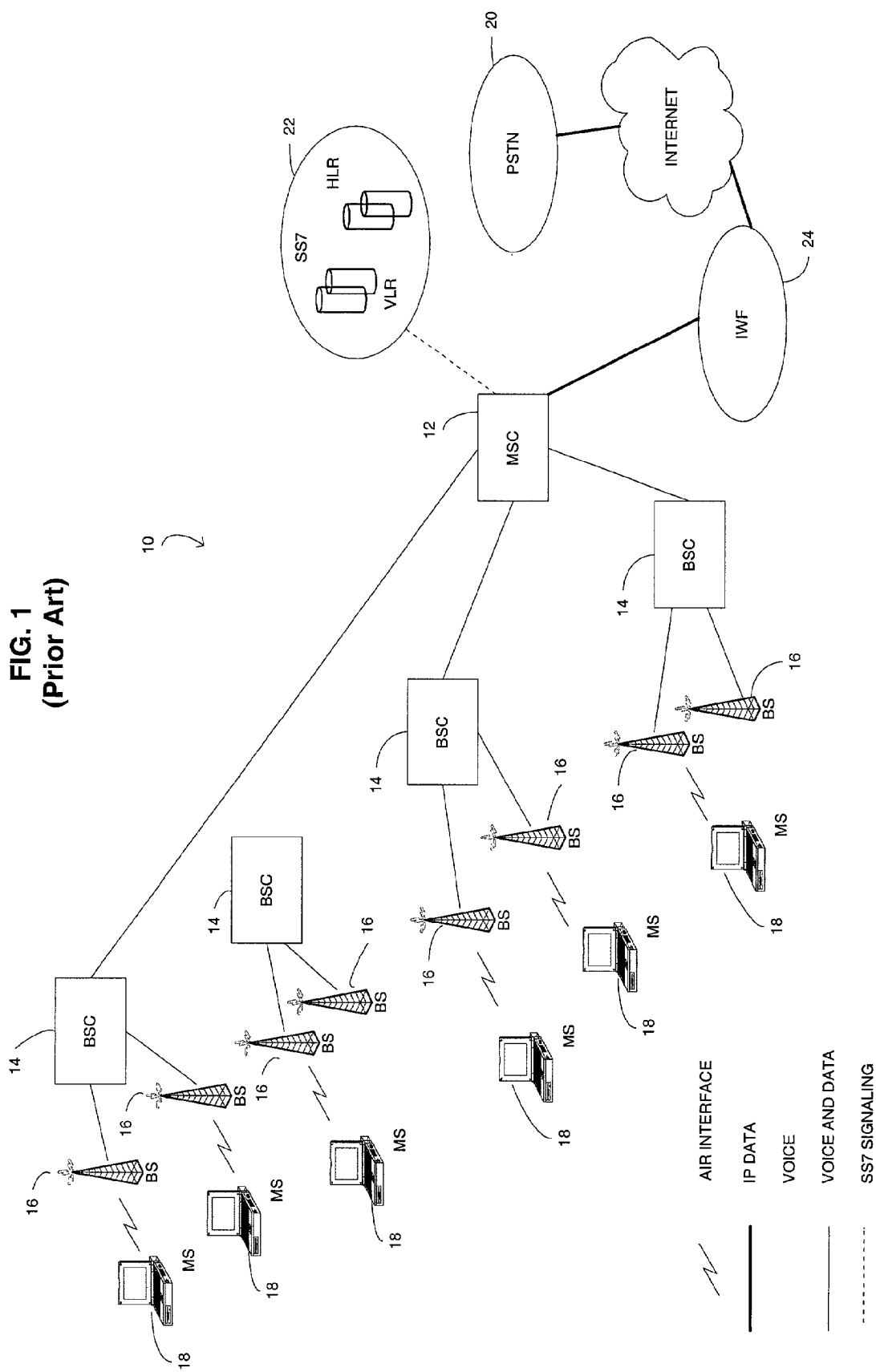
FIG. 1 is an illustration of a conventional cellular system network.
Figure 2:
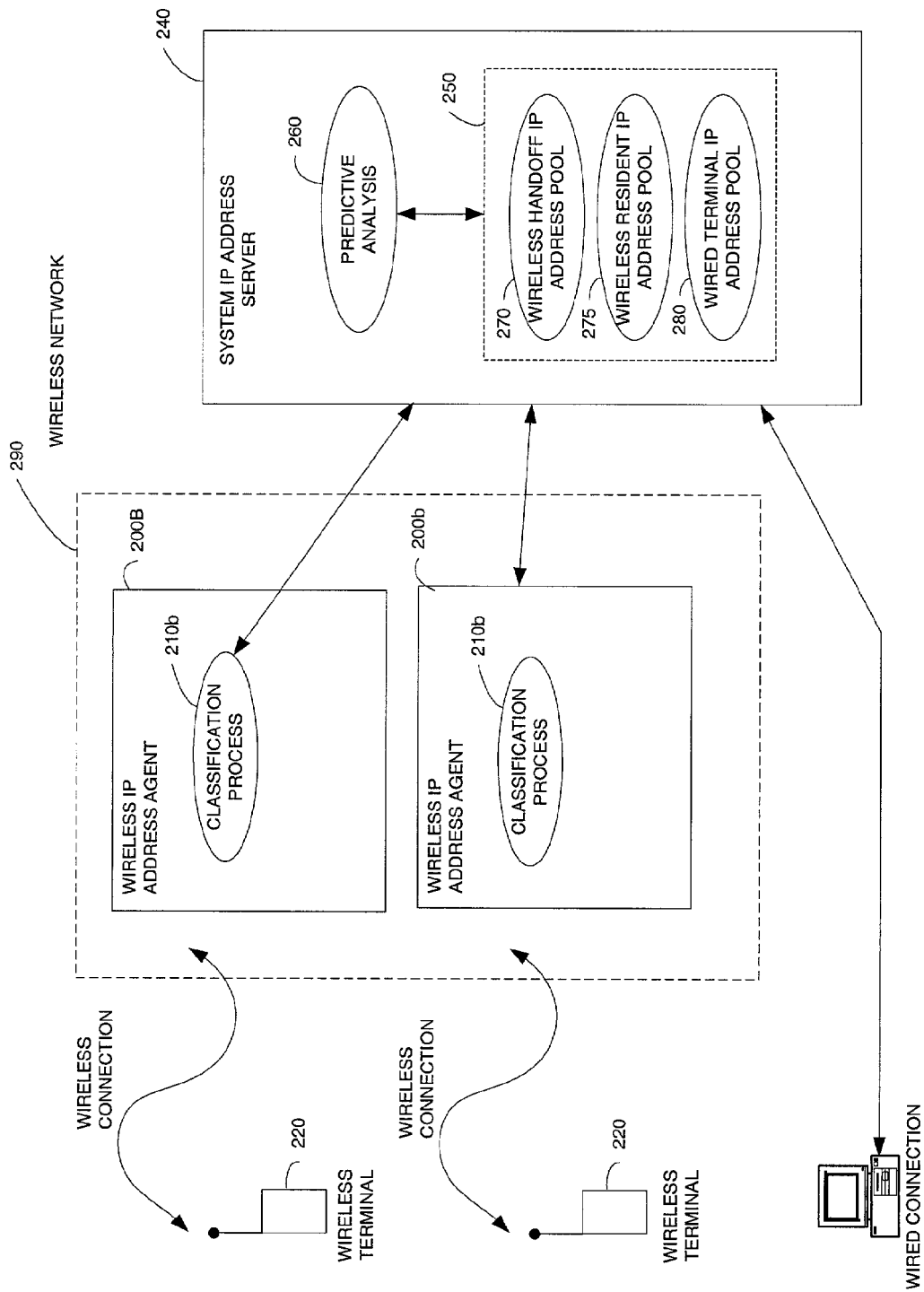
FIG. 2 is a schematic block diagram of shared IP servers without base station requests.

FIG. 2 is a schematic block diagram of shared IP servers without base station requests in accordance with an exemplary embodiment of the present invention. The system and method of the invention provides dynamic addressing of servers (e.g., DHCP servers) such that the allocation of a proper portion of IP addresses to wireless host and wireline hosts is ensured. A wireless host 220 is an end user device which is connected to a network 290 via wireless channels. Such devices can be further categorized by whether they are in a handoff state (handoff) or are residents of a current wireless base station (resident).

In accordance with the invention, a single system IP address server 240 is used to periodically and dynamically update allocation pools of IP addresses which are reserved for wireless or wireline hosts 220. The system IP address server 240 controls an entire address pool 250, contains predictive analysis logic 260, performs a predictive analysis, partitions the IP addresses 250 into distinct address pools 270, 275, 280, such that "wireless guard bands" of IP addresses for wireless users are maintained to ensure that a higher priority address pool is never exhausted before an address pool which has a lower priority. The system IP address server 240 also possesses an interface (not shown) with which to add, or delete, IP addresses from each of the distinct address pools 270, 275, 280 as required. A guard band is a pool of IP addresses which are dedicated to a specific type of host (e.g., wireless hosts). Within the pool of IP addresses allocated to wireless hosts, a "handoff guard band" of IP addresses 270 is established for handoff hosts, a "resident guard band" of IP addresses 275 is established for resident hosts, and a "wired guard band" of IP addresses 280 is established for wired terminals.

The predictive analysis 260 is performed in the system IP address server 240 to determine the number of IP address to allocate to wireless terminals in a handoff state, wireless terminals in a resident state, and wired terminals. In certain embodiments, the predictive analysis is performed using a moving weighted average, where the average number of requests from hosts in each category is recorded and the average number of total IP addresses over a suitable fixed period of time is computed. In the preferred embodiment, the suitable fixed period of time is approximately 10 minutes. In other embodiments, the size of the guard bands is calculated statistically by determining the required volume of IP addresses over a fixed period of time. Here, various statistical parameters may be used, such as the time of day, the "mix" of traffic, special situations (expected and unexpected), or the like.

The following IP address guard bands are established within the system IP address server 240:

(i) Wireless guard bands: A pool of IP addresses is dedicated to wireless hosts. The size of the wireless guard band is dynamically based on the changing IP address demands of wireless and wireline terminals in the domain of the IP address servers (e.g., the DHCP servers); and (ii) Handoff guard bands: A pool of IP addresses from the IP space is allocated to wireless users for the support of handoff hosts. The size of such "handoff guard bands" is dynamically adjusted based on the handoff volume. IP address servers 240 dynamically predict the size of each guard band. The IP address servers then partition the shared pool of IP addresses accordingly before the anticipated IP address demands actually arrive. The shared address server 240 predicts the sizes of the address guard bands for each base station, and logically partitions the available shared address space on the system IP address server 240 for the guard bands based on information gathered from each base station.

A priority is assigned to a host requesting a new IP address. Handoff hosts are provided with a higher access priority than other hosts, such that system IP address servers process address requests from the handoff hosts before processing requests from other hosts. Priorities of the hosts are communicated to the IP address servers (e.g., the DHCP servers). As a result, the servers will service the host having the highest priority first. This permits wireless terminals to obtain IP addresses faster during handoff, and therefore reduces handoff latencies.

A classification process 210a, 210b is used to classify wireless hosts into handoff hosts and dormant hosts. Handoff hosts carry active sessions across network boundaries and are rapidly configured with a valid IP address to preserve application level quality. Dormant hosts are those that are not actively communicating, and therefore possess greater latency latitudes with respect to configuration of the IP address.

A minimum number of addresses or guard band in the wireless handoff IP address pool 270, the resident handoff IP address pool 275 and the wired terminal IP address pool 280 (a classification) are set aside so that each are unaffected by a particular reallocation scheme. As a result, the system IP address server 240 will be unable to revoke addresses from a classification such that the total number of addresses available in the classification is never brought below the guard band number. In addition, if a number of addresses are allocated as a result of wireless terminal requests that brings the total available IP addresses in such an allocation pool below the number of addresses in the guard band, an automatic request occurs to replenish the allocation pool up to the guard band level. For example, if the number of IP addresses assigned to a "wireless resident" host address pool is 100 with a guard band of 10, then in accordance with the invention at least 10 addresses are maintained in the pool. Hence, if 95 "wireless resident" hosts addresses are requested and granted, an automatic attempt is made to allocate at least another 5 addresses to this category to maintain the appropriate guard band.

In accordance with the invention, a wireless handoff host is distinguished from a wireless resident host by determining whether the host has changed, or is in the processes of changing, its current point of attachment to the network. For instance, handoff hosts are required to have undergone link-layer handoff procedures to establish a valid link layer with which to communicate with a base station (not shown). The base station will possess knowledge of this, and can use this information to identify hosts that have been handed off from other base stations.

Implementation of the classification process 210a, 210b varies according to the specific wireless access technology in use, such as CDMA, Time Division Multiple Access (TDMA), 802.11b, or the like. When using CDMA, a handoff is always preceded by a Handoff Request Message.

This provides the base station with the ability to determine whether a terminal is a wireless handoff terminal based on the received Handoff Request Message. This is not the case with wireless resident hosts, and there are no handoff messages received by the base station associated with these terminals. Therefore the classification process can use this information to determine the nature of the request. If a request comes from a wireless terminal "shortly" after a Handoff Request Message was received from this terminal, the wireless terminal is classified as a wireless handoff host, otherwise it is classified as a wireless resident host. Here, "shortly" is implementation specific, and is programmed by the network administrator such that it is any time period desired. However, a time period which is too large is disadvantageous when used in the present contemplated embodiments. In the preferred embodiment, a time period in the range of approximately 30 to 60 seconds is used. Hence, when an address request is received from a terminal having a prior Handoff Request Message associated with it in the previous 60 seconds, the terminal is classified as a wireless handoff host.

Wireless IP address agents 200a, 200b are software which resides in the wireless network 290. Each wireless IP address agent handles requests for IP addresses from the wireless terminals 220, categorizes the wireless terminal as handoff or resident, and then forwards the IP address associated with the handoff hosts or resident hosts to the system IP address server 240. In embodiments, the wireless IP address agents 200a, 200b reside in wireless base stations (not shown) which provide link layer attachments to wireless terminals. Here, the base stations receive IP address requests and forward them to the system IP address server 240. As a result, the system IP address server 240 can distinguish between IP address requests which originate from wireless or wireline terminals.

Figure 3:
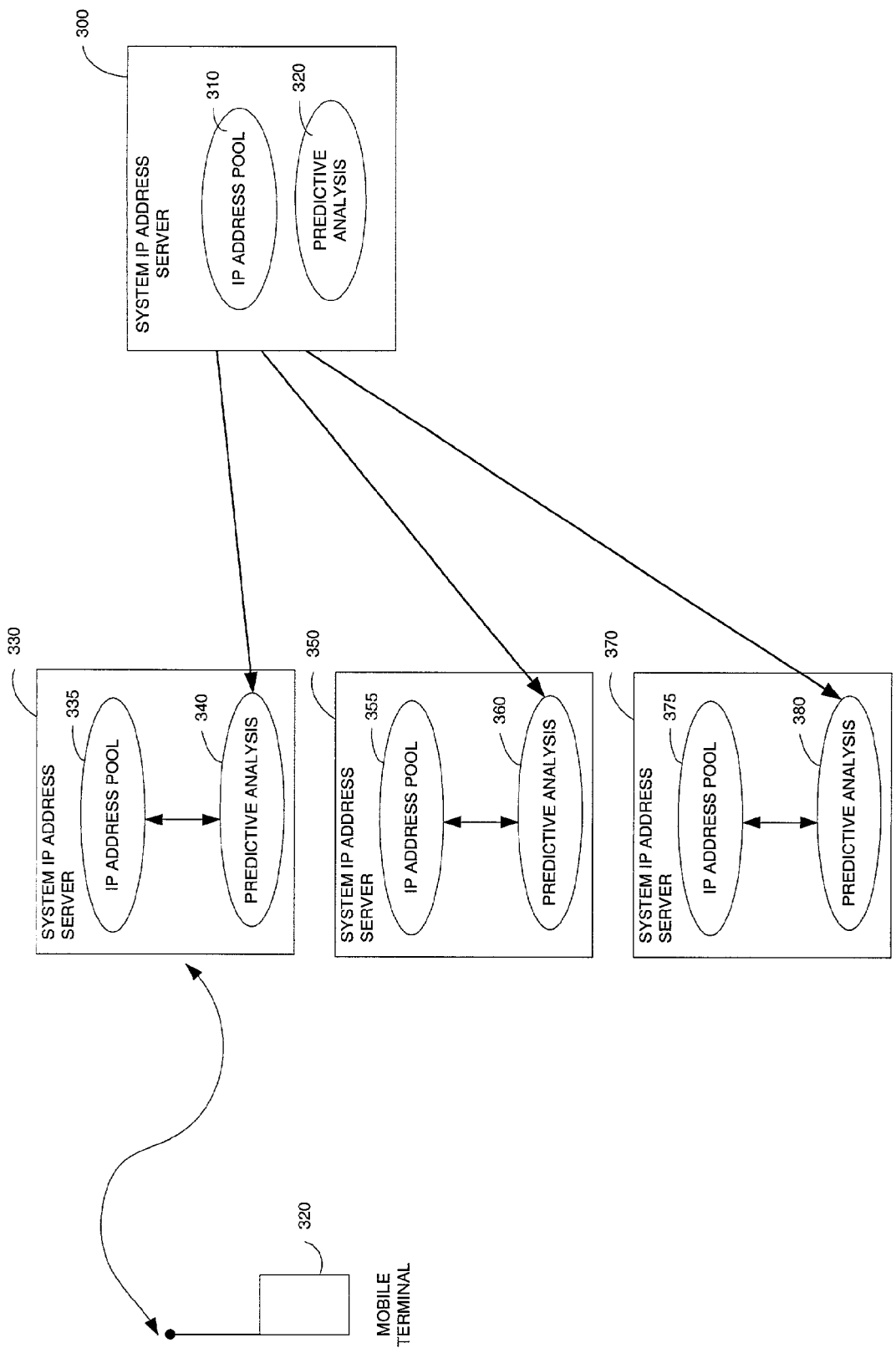
FIG. 3 is a schematic block diagram of shared IP servers with base station requests.

FIG. 3 is a schematic block diagram of shared IP servers with base station requests from mobile terminals 220. Here, each base station 330, 350, 370 uses a predictive analysis 340, 360, 380 to predict a required guard band size for an IP address pool 335, 355, 375. The results of the prediction are provided to a shared system IP address server 300. A final decision on the guard band sizes for each base station is then performed in the system IP address server 300 based on the predictions from the base stations and other overall system considerations, such as the minimum number of addresses to achieve a fair chance of access from each cell.

Figure 4:
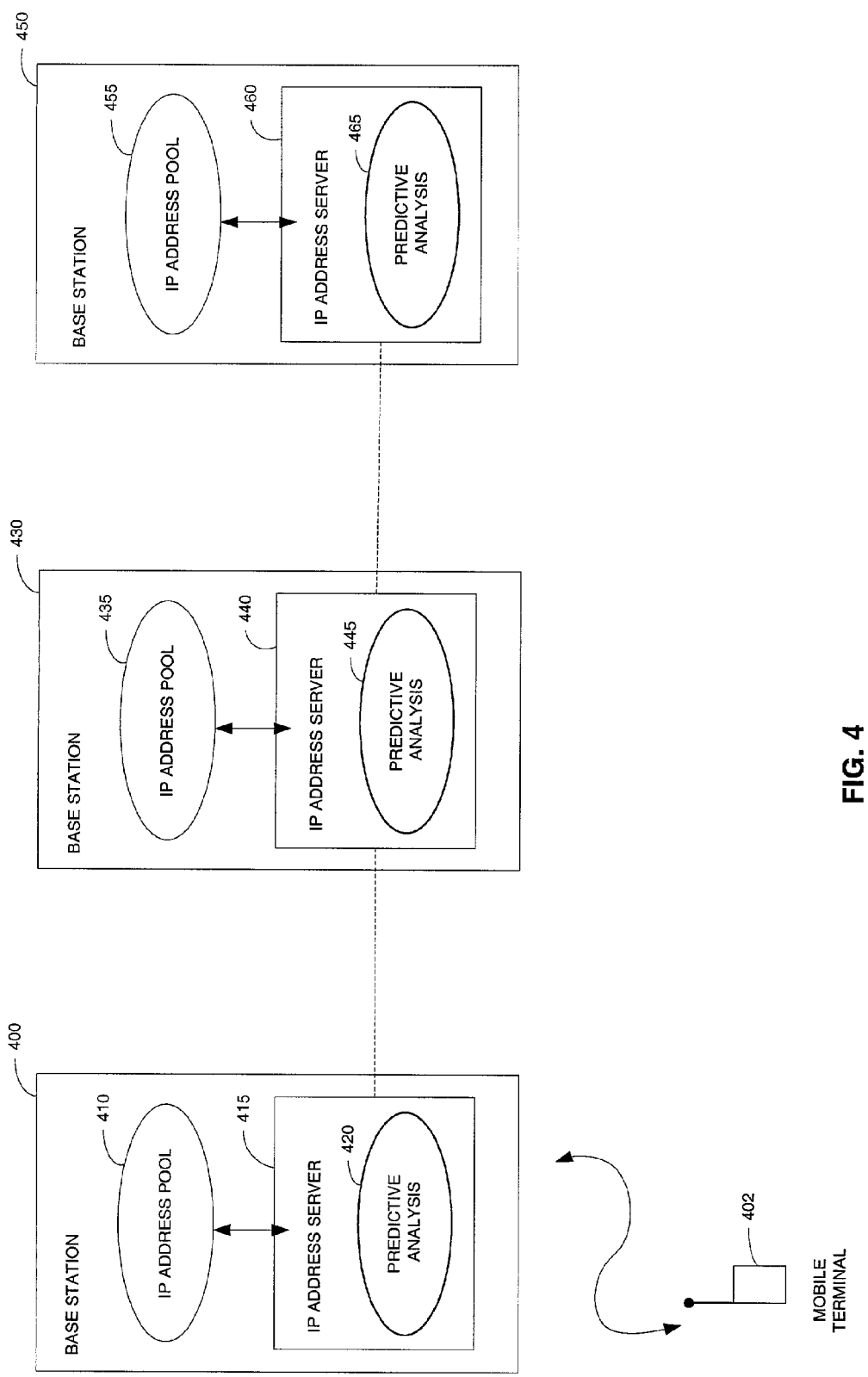
FIG. 4 is a schematic block diagram illustrating base stations with a dedicated IP address server in accordance with the invention.

FIG. 4 is a schematic block diagram illustrating base stations having a dedicated IP address server in accordance with the invention which respond to requests for IP addresses from mobile terminals 402. In this configuration, a system IP address server is not used, i.e., there is no central authority. Instead, all base stations 400, 430, 450 posses an IP address server 415, 440, 460 wherein a respective predictive analysis 420, 445, 465 is performed to determine a required guard band size for a respective IP address pool 410, 435, 455. The base stations coordinate address allocations during base station-to-base station intercommunication.

Figure 5:
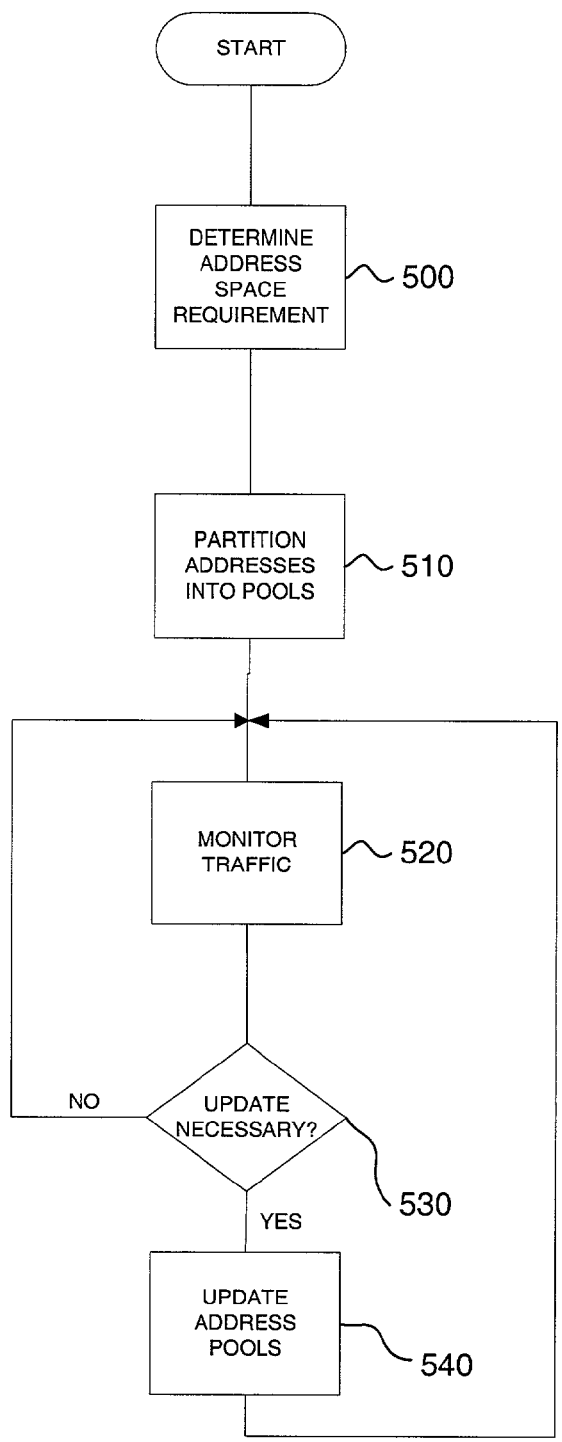
FIG. 5 is a flow chart illustrating the steps of an embodiment of the method of the invention for dynamically allocating Internet protocol addresses for shared wireless and wireline networks.

FIG. 5 is a flow chart illustrating the steps of an embodiment of the method of the invention for dynamically allocating Internet protocol addresses for shared wireless and wireline networks. In accordance with the invention, a determination of a total IP address pool requirement is performed using a predictive analysis, as indicated in step 500. In embodiments of the invention the initial allocation is configured by a network administrator. In addition, the predictive analysis may be performed using a number of predictive algorithms, such as a moving weighted average. Here, the average number of requests from hosts in each device category is recorded, and the number of requests over a fixed period of time is calculated. In the preferred embodiment, an exemplary time period is 10 minutes.

Next, the total IP address pool is partitioned into groups of addresses which are designated for use with an associated user group or classification, i.e. a handoff group, a resident group and/or a wired terminal group, as indicated in step 510.

An IP address server is used to monitor IP address demands associated with a cell, as indicated in step 520. A check is performed to determine whether an update of the total IP address pool is necessary, as indicated in step 530. If this is the case, the IP address server will periodically and dynamically update the allocations reserved for the groups of addresses which are designated for use with the associated user group, as indicated in step 540. A return to step 520 occurs to continue monitoring IP address demands associated with the cell. If no update is necessary, the method of the present invention will return to step 520 where monitoring of IP address demands associated with the cell is repeated. In this manner, continuous monitoring of IP address demand is performed to ensure the continuous allocation of a proper portion of IP addresses to wireless host and wireline hosts.

A number of features of the present invention will be apparent to one skilled in the art. First, third parties such as wireless Internet Service Providers (ISPs) can control allocation of IP addresses to network cells. The present invention enables wireless and wireline ISPs to specify and control how IP addresses should be allocated to network cells in the wireless IP network, thereby allowing the ISP to allocate more IP addresses in specific network cells. For instance, an ISP may allocate more IP addresses to an area where high-paying customers reside so that network performance in that area is enhanced.

When allocating IP addresses to cells, third-party ISPs may directly specify the number of IP addresses to allocate to each cell or geographical area that is covered by multiple network cells in order to support the third-party's services. A third-party may also specify performance objectives that can be achieved by a plurality of IP address allocations to the network cells, and then allow the IP address servers to allocate IP addresses to meet these performance objectives. For instance, a third-party may specify call blocking probabilities and quality of service for a geographical area, and then allow the wireless IP network address servers to determine the actual IP address allocations for cells within the geographical area to meet these performance objectives.

Using the method of the invention, a rapid priority based configuration of IP addresses for wireless users is achieved. IP addresses are reserved for handoff hosts such that handoff call blocking due to lack of IP addresses in a new cell is minimized. In addition, the reservation of IP addresses for wireless dormant hosts minimizes the time to configure IP addresses.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for dynamically allocating Internet Protocol addresses for a wireless cell, said method comprising:
   determining a total Internet Protocol address pool for the wireless cell, wherein said step of determining includes the step of utilizing at least one of:
   real-time data, including present network IP address demands associated with the wireless cell;
   non-real time data including previous IP address demands associated with the wireless cell;
   call blocking parameters;
   quality of service and performance parameters; and
   third party data including third party ISP address allocation specifications, quality of service parameters or performance parameters;
   partitioning the Internet Protocol address pool into groups of address spaces for use with an associated user group within the wireless cell;
   monitoring IP address demands associated with the wireless cell; and
   updating the groups of address spaces using an IP server.

2. A method for dynamically allocating Internet Protocol addresses for a wireless cell, said method comprising:
   determining a total Internet Protocol address pool for the wireless cell;
   partitioning the Internet Protocol address pool into groups of address spaces for use with an associated user group within the wireless cell;
   monitoring IP address demands associated with the wireless cell;
   updating the groups of address spaces using an IP server; and
   assigning a priority level to a mobile host requesting an IP address associated with each wireless cell;
   wherein the priority level is set at a first level in the case of a handoff mobile host and at a second level in the case of a resident mobile host, and the first priority level is greater than the second priority level.

3. A method for dynamically allocating Internet Protocol addresses for a wireless cell, said method comprising:
   determining a total Internet Protocol address pool for the wireless cell;
   partitioning the Internet Protocol address pool into groups of address spaces for use with an associated group within the wireless cell, said step of determining a total Internet Protocol address pool comprising the step of performing a predictive analysis to allocate Internet Protocol address space for the associated user group within the wireless cell;
   monitoring the IP address demands associated with the wireless cell;
   updating the groups of address spaces using an IP server; and
   establishing guard bands for device categories to ensure a minimum number of Internet Protocol addresses are available for the device categories based on the predictive analysis.

4. A method for dynamically allocating Internet Protocol addresses for a wireless cell, comprising:
   performing a predictive analysis to allocate Internet Protocol address space for an associated user group within the cell;
   partitioning the Internet Protocol address space into groups of address spaces for use with the associated group based on the predictive analysis;
   updating the Internet Protocol address space via an IP address server; and
   establishing guard bands for device categories to ensure a minimum number of Internet Protocol addresses are available for the device categories.

5. The method of claim 4, wherein the device categories comprise at last one of wireless devices during handoff, resident wireless devices and wired devices.

6. The method of claim 5 further comprising the step of adjusting the guard bands based on the predictive analysis.

7. The method of claim 5, wherein said predictive analysis is performed using a moving weighted mean average.

8. The method of claim 7, wherein said moving weighted average comprises the steps of:
   recording an average number of requests from hosts in each user group; and
   computing an average number of total IP addresses over a suitable period of time.

9. The method of claim 8, wherein said suitable fixed period of time is 10 minutes.

10. A system of for dynamically allocating Internet Protocol addresses for wireless cells, said system comprising:
    an IP address server which determines a total Internet Protocol address pool for the wireless cell for use with an associated user group within the cell and performs a predictive analysis to determine a required Internet Protocol address pool for the wireless cell, wherein the server monitors the IP address requests associated with the wireless cell and updates the groups of address spaces based on the IP address requests;
    a plurality of base stations, said base stations residing in a wireless network; and
    wherein each of the plurality of base stations performs a predictive analysis to establish guard bands for a handoff host and a classification analysis to determine whether a wireless terminal is in a handoff state or is a resident host.

* * * * *

UNITED STATES PATENT AND TRADEMARK OFFICE
CERTIFICATE OF CORRECTION

| | | |
|---|---|---|
| PATENT NO. | : 7,016,324 B2 | Page 1 of 1 |
| APPLICATION NO. | : 10/045266 | |
| DATED | : March 21, 2006 | |
| INVENTOR(S) | : Agrawal et al. | |

It is certified that error appears in the above-identified patent and that said Letters Patent is hereby corrected as shown below:

In the Claims

In Column 10, Line 21, in Claim 6, delete "claim 5" and insert -- claim 5, --, therefor.

In Column 10, Line 31, in Claim 8, delete "suitable period" and insert -- suitable fixed period --, therefor.

Signed and Sealed this
Eleventh Day of November, 2014

Michelle K. Lee
*Deputy Director of the United States Patent and Trademark Office*